UNITED STATES PATENT OFFICE.

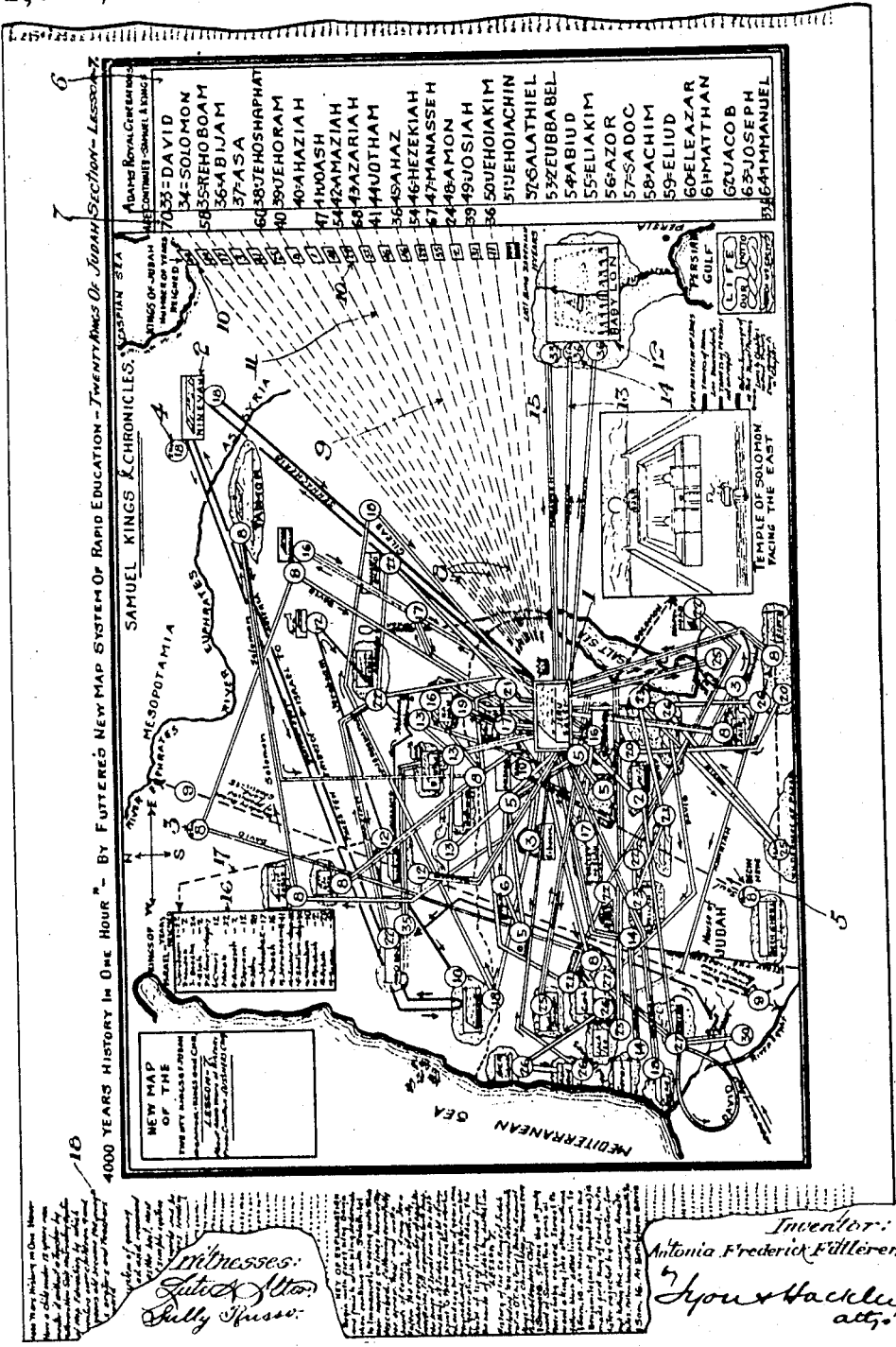

ANTONIA FREDERICK FÜTTERER, OF LOS ANGELES, CALIFORNIA.

EDUCATIONAL DEVICE.

1,196,099.  Specification of Letters Patent.  Patented Aug. 29, 1916.

Application filed October 28, 1912. Serial No. 728,274.

*To all whom it may concern:*

Be it known that I, ANTONIA FREDERICK FÜTTERER, a citizen of Australia, residing at Los Angeles, in the county of Los Angeles and State of California, have invented a new and useful Educational Device, of which the following is a specification.

This invention relates to a device by means of which history may be very quickly learned. In the present instance I have shown the device as constructed for teaching Bible history.

The drawing is a plan view of one form of a map.

Briefly, the invention comprises a map of the place on earth where the historical events which are being studied have occurred. Chapters of history with leading events only from first to last are connected on the map by unbroken travel lines, and in order to represent the different journeys and kinds of people seen, the travel lines are differentiated, as double, single, black, white, red, etc. To depict the royal generations in Biblical history red lines and gold letters are employed.

The map herein shown is one of nine systematic maps used in teaching the subject "4,000 years history in one hour," the maps being linked together in unbroken succession and giving the brief outline of Jewish history.

The map herein shown teaches that portion of Biblical history comprised in the books of Samuel, Kings and Chronicles. The device contains as a background a map of the country in which the events concerned in those books occurred, the map showing the shores of the Mediterranean Sea at the left and the Salt Sea at the right, as indicated. A little below the center of the map is shown a diagrammatic picture of Jerusalem, indicated at 1. Various other cities or towns are shown on the map by rectangles, each rectangle containing the name of the place and being situated in its proper relative geographical location as nearly as possible, thus Nineveh indicated at 2 in the upper right hand part of the map. Certain parts of historical events which consist of travels of the Biblical characters may be graphically shown. Thus, travel lines extend from Jerusalem in the rectangle 1 to Nineveh in the rectangle 2, illustrating certain travels to and from Jerusalem and to and from Nineveh.

The travels of characters who are descendants of the royal line are shown in red lines. On the map these red lines consist of double parallel lines. The return journeys of persons of the royal line are indicated in my device by red lines, and on the drawing herein shown such return journey-lines are shown by three parallel lines. The travels of persons not of royal lines are shown by heavy black continuous lines. Black dotted lines extend to chapters without travels, while each chapter is depicted as a number printed in black and located within a circle. Thus in the upper left hand corner is a circle 3, within which circle is the number 8. I also place within the circle the abbreviation of the chapter. Thus in circle 3 above the number 8 is "2 Sam." At the upper right hand portion of the map is a circle 4, containing the number 18, above which is printed "2 Kgs." In the lower left hand portion of the map is a circle 5, in which is printed the numeral 8, above which is printed "1 Sam."

I have only shown the abbreviation of chapters in certain of the circles owing to the necessarily reduced size of the drawing, but it should be understood that all circles preferably contain in addition to the numbers shown therein the name of the chapter, although that is not essential, for in cases where the name of the chapter is not mentioned in circles, it is because the chapters all belong to one particular book seen in the margin.

At the right hand side of the map is a rectangle 6, in which is printed the names of the royal generations, each generation being numbered. The back-ground of the rectangle 6 is in red, symbolical of the line of sacrifice, while the names are printed in gold, symbolical of royal lineage. It should be understood that these colors are not arbitrary, but that they are a great educational aid on account of the symbolical meaning.

The first generation in the rectangle 6 is numbered 33 and is David. At the left of the rectangle 6 is a vertical rectangle 7 in which appears the age of the royal descendant, the age being placed opposite the descendant. This rectangle is white, and the number designating the age is in black, thus opposite David is the number 70, indicating that the age of David was seventy years.

Extending from the rectangle 1 at Jerusalem are dash-lines 8, which diverge and extend to certain of the respective names of royal descendants in the rectangle 6. Thus the dash-lines designated 9 extend to royal descendant number 44, Jotham. At the left of rectangle 7, and upon each dash line 8 is a rectangle 10, each rectangle 10 containing a designation showing the number of years the King of Judah reigned who corresponded with the dash line leading thereto, thus dash line 11 leading to Amaziah in rectangle 6 is shown in associated rectangle 10 as having reigned twenty-nine years.

At the lower right hand corner is a rectangle 12 containing a diagrammatic depiction of Babylon and leading from rectangle 1, Jerusalem, is double dotted (red) line 13 extending to circle 14 containing number 36. Printed on the line 13 is Jehoiakim, the name of the person, and the arrow designates the direction of his journey, i. e., from Jerusalem toward Babylon. The number 36 in circle 14 indicates the chapter containing an account of this journey. It will be understood that the numeral 36 in circle 14 refers to "2 Chr.," which is the book in which this journey is described. The triple line 15 extending from rectangle 1 at Jerusalem to circle 33 at Babylon contains the printed word "Manasseh." The triple line indicates that this king traveled from Jerusalem toward Babylon and returned to Jerusalem. An account of this is given in book corresponding to 33.

In the upper left hand corner is a rectangle 16 containing the names of the Kings of Israel and the years that they reigned. This rectangle is connected by black dotted lines 17 with circle 12 and indicates a chapter without travels.

At the left of the device is printed at 18 an explanation of the method, the same being continued at the right, but broken away in the drawing herewith. Thus the present map, relating to lesson 7, is explained as follows:—

"History of the twenty Kings of Judah (including last ten royal descendants not in O. T. History)—Books Samuel, Kings and Chronicles.—Period 2000 to 4004 (Usshers Chr.).

1 Samuel 8. Shows the ill judgment of Samuel's two sons at Beersheba caused Israel to want a king like other nations. Follow black dotted lines north to 1 Sam. 10. At Mizpah, Saul the Benjamite (not of royal blood) is made first King of Israel, but is later rejected by Creator for not killing the accursed Amalekites. Follow black dotted line south, then east to 1 Sam. 16."

Thus may be seen and followed, from first to last event, a connected unbroken line of historical outlines, as recorded in the Bible, or book in question, from one locality to another in consecutive order.

In order to guide the student from one event to the next succeeding event, so that the historical order will be given in proper sequence, I provide arrows, as shown, leading from place to place on the map. Thus the present section is begun at circle 19 at the bottom of the map. Following the direction of the arrow, the next circle reached contains "1 Sam. 10"; from here the arrow points south to circle containing "1 Sam. 16." Where the lines near Jerusalem at the center, they necessarily come close together, and although at this point are more difficult to follow even with the arrows, reference to the printed description in the margin makes the direction clear. From "1 Sam. 16" the arrow leads to "1 Sam. 17" and from "1 Sam. 17" at Valley of Elah the arrow leads to "1 Sam. 17" shown north of Jerusalem and from "1 Sam. 17" leads to "1 Sam. 19", the latter travel being a triple line, and hence is to be retraversed from "1 Sam. 19" to "1 Sam. 21" via. "1 Sam. 17", as indicated by the arrow. The events are also briefly comprehended by an illustration of same, right on the locality where the said event occurs. For example, see a picture of a golden calf in Dan and Bethel on map; meaning that the King Jeroboam there set up idolatry to prevent Israel from returning to Jerusalem, etc.

The device thus at a glance shows the map of that part of the earth where events occur; the locality on the map; the travels of characters in question; the chapters of corresponding written history; the printed description of each chapter to correspond; the names and right order of royal generations; the right order of consecutive history; the right order of consecutive books or chapters of history, and the right order of consecutive events and localities shown in addition to above by an illustration of said events.

What I claim is:

An educational device to graphically represent events described in a book comprising a map having different kinds of travel lines printed thereon to indicate respectively the journeys of different people, said map having illustrative figures thereon to and from which the travel lines lead and which indicate where events occurred and reference characters associated with the illustrative figures and having reference to the part of the book where the events are described.

In testimony whereof, I have hereunto set my hand at Los Angeles, California, this 22nd day of October, 1912.

ANTONIA FREDERICK FÜTTERER.

In presence of—
GEORGE T. HACKLEY,
F. A. CRANDALL.